(No Model.)
H. R. TOWNE.
KNOB ATTACHMENT.
No. 253,132.  Patented Jan. 31, 1882.
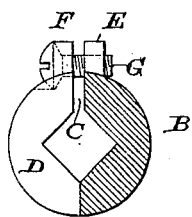
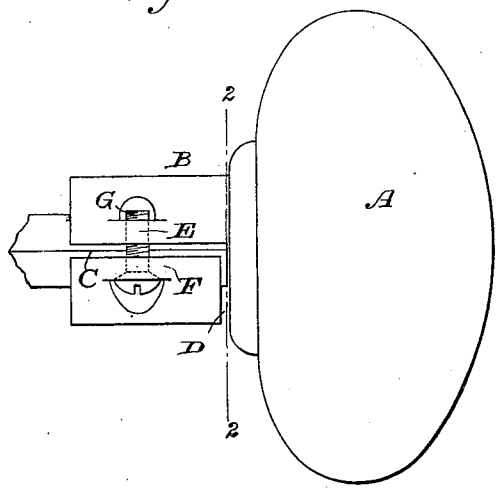
WITNESSES
Wm A. Skinkle.
H. W. Elmore.
INVENTOR
Henry R. Towne.
By his Attorneys
Baldwin, Hopkins, & Peyton

UNITED STATES PATENT OFFICE.

HENRY R. TOWNE, OF STAMFORD, CONNECTICUT, ASSIGNOR TO THE YALE LOCK MANUFACTURING COMPANY, OF SAME PLACE.

KNOB ATTACHMENT.

SPECIFICATION forming part of Letters Patent No. 253,132, dated January 31, 1882.

Application filed October 10, 1881. (No model.)

*To all whom it may concern:*

Be it known that I, HENRY R. TOWNE, of Stamford, county of Fairfield, and State of Connecticut, have invented certain new and useful Improvements in Shanks for Knobs, and in the mode of attaching them to knob-spindles, of which the following is a specification.

The object of my invention is to provide a simple, cheap, and reliable means for securing a knob-shank to a spindle that will permit the ready adjustment of the spindle within the shank without the use of washers to accommodate variations in the thickness of different doors.

In the accompanying drawings, illustrating my invention, Figure 1 is a view of a knob and knob-shank, showing the spindle in position. Fig. 2 is a section of a shank on the line 2 2 of Fig. 1.

A is a knob, to which is secured in any suitable way a knob-shank, B, that is provided with a longitudinal slot, C, extending from the spindle-socket out radially through the wall of the shank. A transverse slot, D, extending about half-way through the shank, is also formed near the junction of the shank with the knob, which enables the parts of the shank separated by the longitudinal slot to be pressed toward each other.

E and F are lugs projecting from the shank on each side of the slot C, and adapted to receive a screw, G, by the operation of which they may be drawn together.

When the spindle is properly adjusted in its socket the sides of the shank are forced together by the operation of the screw G, working in the lugs E and F, which causes a pressure to be exerted upon the spindle along the entire length of the shank, thus securely holding it in place.

I do not broadly claim a knob-shank with a longitudinal radial slot and a transverse slot intersecting the same, as that is not my invention. My invention is limited to such a shank provided with special fastening appliances, as indicated in my claim.

Having thus described my invention, what I claim, and desire to secure by Letters Patent, is—

A knob-shank provided with a longitudinal slot, C, transverse slot D, and lugs E and F, in which works the screw G, substantially as herein set forth.

In testimony whereof I have hereunto subscribed my name this 2d day of August, A. D. 1881.

HENRY R. TOWNE.

Witnesses:
 SCHUYLER MERRITT,
 GEO. E. WHITE.